United States Patent
Neumeister

[15] 3,687,394
[45] Aug. 29, 1972

[54] CORD CREEL

[72] Inventor: Alvin W. Neumeister, Tallmadge, Ohio 44678

[73] Assignee: The Goodyear Tire & Rubber Company, Akron, Ohio

[22] Filed: June 9, 1971

[21] Appl. No.: 151,338

[52] U.S. Cl. ............................................. 242/131
[51] Int. Cl. ........B65h 49/02, D02h 1/00, D03j 5/08
[58] Field of Search ..........242/131, 131.1; 28/32, 51

[56] References Cited

UNITED STATES PATENTS

| 2,432,284 | 12/1947 | Chipman | 242/131 |
| 2,552,338 | 5/1951 | McBrige | 242/131.1 |
| 2,688,789 | 9/1954 | Duryee | 28/51 |
| 2,885,158 | 5/1959 | Koppelman | 242/131 |

Primary Examiner—Leonard D. Christian
Attorney—F. W. Brunner and Robert S. Washburn

[57] ABSTRACT

A creel for supplying cords or wires to a calender, in which the tension in each individual cord is controlled by a pump-motor device capable of pumping an energy medium such as air to a storage chamber while exerting a braking effort on the spool from which the cord is unwound and of rotationally reversing to act as a motor driven by air from the chamber to rewind such cord if broken, or to retension the cord should it become slack.

17 Claims, 3 Drawing Figures

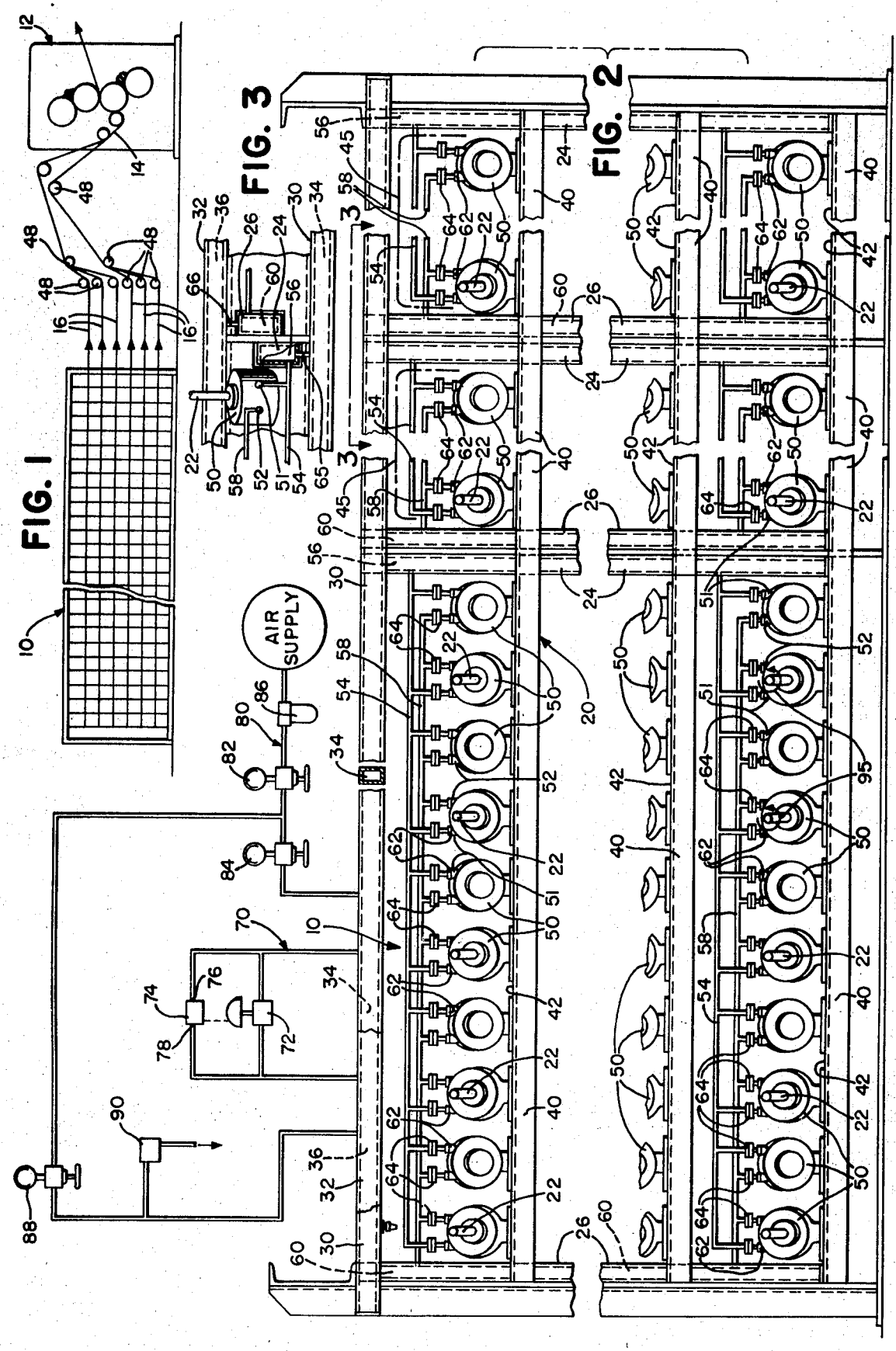

CORD CREEL

The foregoing abstract is not to be taken as limiting the invention of this application, and in order to understand the full nature and extent of the technical disclosure of this application, reference must be made to the accompanying drawings and the following detailed description.

This invention relates to apparatus for controlling the tension in one or each cord of a plurality of cords each extending respectively from a spool on which one such cord is wound, and particularly to an apparatus generally referred to as a creel from which a plurality of such cords are supplied to apparatus in which the plurality of cords are treated. Still more particularly, a creel including a multiplicity of spools, each mounted on a spindle having a reversible controlling torque applied thereto, supplies a plurality of cords to an apparatus, such as a calender wherein the cords are to be covered with a rubber compound to form ply material for the manufacture of tires.

An object of the invention is to provide a low cost and simple apparatus for the control of the tension in a cord or in each cord of a plurality thereof as such cords are supplied from a creel to apparatus in which the plurality of cords is to be treated.

A further object is the provision in a creel of tension control apparatus capable of being reversed in rotational sense, in the event of breakage of a cord, or of the tension in a cord becoming less than a selected minimum value, in order to rewind said cord upon the spool.

Another object of the invention is the provision of tension control apparatus capable of providing adequate tension control in each cord as well as adequate uniformity of the individual cords of the plurality of cords being paid off from the creel.

The foregoing objects and advantages, as well as others which will become apparent or be particularly pointed out as the description proceeds, are accomplished in accordance with the invention by an apparatus comprising energy conversion means capable of pumping an energy medium such as a fluid to a higher energy level or pressure in response to the rotation of a spool from which a cord is being unwound, and which means is reversible to receive the medium from the higher level and converts the energy thereof to rewind such cord onto the spool. Spindle means rotatably supporting each spool is coupled to the energy conversion means exemplified by a fluid pump-motor device capable of being reversed in rotational sense. As the spool rotates while the cord is being unwound therefrom, the device delivers energy in the form of compressed fluid into storage means, the energy level or pressure difference between the fluid entering the device, and the medium being delivered by the device is regulated at a preselected value. Should the cord be broken or the tension therein reduced, as by reason of a change in speed of the apparatus being served, the direction of flow of the energy medium is reversed relatively through the device, causing the same to reverse its rotational sense and act then as a motor to rewind the cord, either completely as in the event of a break, or sufficiently to restore the tension to the desired value. A further feature of the invention provides that the frame of the creel on which the spools are carried includes, as structural parts thereof, members forming chambers which provide storage means for the energy medium or fluid.

In a further aspect of the invention a plurality of pump-motor devices are connected to deliver, during normal unwinding of cords, a fluid medium at elevated pressure to a storage chamber and to receive fluid medium from a second chamber, the two chambers being interconnected for fluid flow therebetween so as to provide a closed fluid system in which the operating fluid medium can circulate free of contamination by foreign materials. Between the two chambers, throttling means is provided for control of the flow of fluid therebetween in response to the means for regulating the differential pressure between the respective inlet/outlet means of the plurality of pump-motor devices.

An illustrative embodiment of the invention will be described in detail with reference to the accompanying drawings in which:

FIG. 1 is a schematic view of apparatus embodying the invention;

FIG. 2 is an elevation view in larger scale of the apparatus of FIG. 1, portions being broken away, and portions being shown schematically; and FIG. 3 is a plan view of a portion of the apparatus according to FIG. 1, taken as indicated by line 3—3 in FIG. 2.

Illustrated FIG. 1, an apparatus 10 according to the invention is shown in connection with a calender 12 in which a web-like array 14 of parallel cords 16 is to be covered with a rubber compound. The resulting product from the calender is useful for the construction of tires.

The apparatus 10, commonly called a creel, comprises a frame 20 on which are mounted a plurality of spindles 22 each of which accommodates a single spool having a single cord wound thereon.

The term "cord" as used herein and in the appended claims, is intended to be understood generically and to include any sort of strand, filament, thread, wire, or cable, of any material. In particular, any such cord, strand, or wire is suitable for use in the manufacture of tires.

The frame 20 includes a plurality of upright members 24,26 and at least one cross-member 30. A second cross-member 32 extends parallel to the member 30. Preferably, the members are tubular in form and are constructed and joined so as to provide suitable storage chambers 34,36 for a fluid under pressure as will be pointed out presently.

It will be appreciated also that the frame 20 can be constructed to any dimensions suitable to accommodate the desired number of spools for single cords and that, alternatively, a number of frames such as those illustrated may be combined to provide for the accommodation of the desired number of spools as required for the desired number of single ends in the web-like array 14 or other cord arrangement to be treated.

A plurality of horizontal members 40 are mounted in the frame 20 to extend from or between respective upright members 24,26, and as may be seen in FIG. 2, have mounting surfaces 42 inclined relative to the horizontal to provide a corresponding incline for each of the spindles 22 mounted thereon.

The angle at which the spindles 22 incline is sufficient to retain spools of cord thereon for corotation with the spindles, each of which has drive pin (not shown) engageable with a spool thereon.

Conventional guide means (not shown) are mounted on the frame 20 so that each individual cord 16 can be trained through or over such guide means and the plurality of cords trained from a selected group of spools, for example 45, over guiding or combining rollers 48 or the like in order to provide the desired web-like array 14 at the calender or other treating apparatus.

In order to control the tension in each of the individual cords 16 in accordance with the invention, energy conversion means is provided in the form of a plurality of pump-motor devices 50 each having a rotatable member therein to which one spindle 22 is connected. Referring to FIG. 3, the pump-motor devices 50 employed in the specific embodiment described herein are commercially available air motors of the type reversible in rotation manufactured by the Gast Manufacturing Company of Benton Harbor, Michigan. Each spindle 22 is connected to or made part of a respective motor shaft on which is mounted the rotor (not shown) rotatable within the motor housing.

Each pump-motor device 50 has two ports 51,52 through which the energy medium, which in the present embodiment is air, flows to or from the device 50.

The pump-motor devices 50 are arranged in groups, such as the group 45, mounted in spaced relation on the respective horizontal members 40 so that the spindles 22 extend alternately oppositely from the frame, toward and away from the viewer, FIG. 2. Each of the ports 51 of the devices 50 in a particular group are connected, by a fluid conduit 54, to the chamber 56 provided within the upright member 24. Each of the ports 52 of the devices 50 of each respective group is connected by a fluid conduit 58 to the chamber 60 provided within the upright member 26.

Each of the ports 51,52 is connected to a respective one of the fluid conduits 54,58 through a conventional flow control valve 62, and for convenience is provided with a quick disconnect coupling 64 to permit shut-off, removal, and/or replacement of any individual pump-motor device 50. The respective chambers 56 in the upright members 24 are connected, as best seen in FIG. 3, by a connector 65 to the chamber 34 provided within the horizontal cross-member 30 so as to form a common storage means connected to each of the ports 51 for fluid flow communication therebetween. The chambers 60 within the respective upright members 26 are each connected to the chamber 36 provided within the horizontal member 32 by a connector 66 so as to form a storage chamber connected for flow communication with each of the ports 52.

A cross-over connection 70 for flow communication between the respective chambers 34 and 36 is provided with a throttling valve 72 which is controlled in response to a conventional pressure controller or differential pressure measuring instrument 74, one side 76 of which is connected to the chamber 34 and the other side 78 of which is connected to the chamber 36.

The chamber 34 is provided also with a connection 80 to a conventional air supply through a pair of pressure regulating valves 82,84 and a filter 86. The chamber 36 is connected to the air supply through the pair of pressure regulator valves 82 and 88. The chamber 36 is also provided with a pressure relief valve 90.

The creel according to the invention is placed in operation by mounting individual spools of cord on each of the spindles 22 or on a number of spindles sufficient to supply the desired web-like array of cords. Each cord 16 is passed through or over suitable guide means (not shown) on the frame 20 and thence about the turning rolls 48 and into the calender 12 or other treatment apparatus. Air at a predetermined pressure is admitted to charge the chambers 34 and 56 providing a pressure or energy level of, for example, 17 pounds per square inch. The chambers 36 and 60 are charged with air at a lower pressure or energy level of, for example, 15 pounds per square inch. The pressure in the chambers 34,56 in flow communication with the ports 51, being greater than the pressure in the chambers 36,60 in communication with the ports 52, tends to urge the pump-motor devices 50 to rotate or at least apply a torque in a direction, arrow 95, such as to wind the cords onto the respective spools. Since the cords are held by the calender or other treating apparatus, tension is created in each of the cords proportional to the pressure difference applied at each of the pump-motor devices. As the calender or other apparatus withdraws the cords from the respective spools, each individual pump-motor device 50 is rotated by the unwinding cord, in a rotational sense opposite to that indicated by the arrow 95. A driving torque is thereby applied to the individual pump-motor devices which act to pump air from the chamber 36 to the chamber 34 at a higher pressure, thus converting the driving effort exerted by the spools on the spindles to fluid pressure, the higher pressure being delivered through the port 51 to the chamber 34.

As air is delivered by the plurality of pump-motor devices into the chamber 34 tending to increase the air pressure therewithin, such increase is detected by the differential pressure instrument 74 which then acts to open the throttle valve 72 sufficiently to maintain the preset pressure in the chamber 34 by permitting air to flow into the chamber 36 from which the air flows into the ports 52 of the respective pump-motor devices.

A particular feature of the invention is that should a cord be broken or the tension therein dropped below a desired value, the associated device 50 acts to reverse the torque acting on the spindle carrying the spool from which the broken or slack cord extends and, therefore, to restore the tension in the cord or cords to the desired value or to rewind the broken cord. By reversing its rotation to rewind the remaining portion of the cord onto the spool, the pump-motor device avoids or reduces tangling of the broken cord with the remaining cords of the array. The flow control valves 62 limit such rewinding to a preset speed as the fluid or air flows from the chamber 34 into the port 51 of the particular device.

In a further aspect of the invention, the rear chamber and the respective connections therefrom to the ports 52 can be omitted, permitting the pump-motor devices to receive air directly from the surrounding atmosphere into the respective ports 52 to be pumped into the front chamber by the unwinding rotation of the pump-motor devices. In such practice, individual filters may be fitted to the respective ports 52.

While certain representative embodiments and details have been shown for the purpose of illustrating the invention, it will be apparent to those skilled in the art that various changes and modifications may be made therein without departing from the spirit or scope of the invention.

What is claimed is:

1. Apparatus for controlling the tension of a cord of a plurality of like cords each extending from a spool on which one said cord is wound, comprising spindle means for releasably and corotatably mounting respectively each said spool for rotation about its own axis for unwinding and winding one said cord respectively from and on said spool, energy converting means including a movable element connected to said spindle means and having a pair of inlet/outlet means for passage of an energy medium into and out of said converting means, said energy converting means being reversible to reverse the rotational sense of said spindle means in response to a change in tension in the respectively associated cord.

2. Apparatus as claimed in claim 1, further comprising regulating means connected between said pair of inlet/outlet means to regulate the energy level of said medium at one of said pair with respect to such level at the other of said pair.

3. Apparatus as claimed in claim 1, wherein said energy conversion means comprises a pumping means, and said energy medium comprises a fluid.

4. Apparatus as claimed in claim 3, wherein said pumping means comprises a pump-motor device operable as a fluid pump and as a fluid motor, and said medium comprises a gas.

5. Apparatus as claimed in claim 1, further comprising energy storage means connected for flow communication of said medium between one of said inlet/outlet means and said storage means.

6. Apparatus as claimed in claim 5, wherein said storage means comprises a chamber for receiving fluid under pressure, said medium being fluid.

7. Apparatus as claimed in claim 6, further including means for connecting said chamber to an auxiliary source of said medium at elevated pressure.

8. Apparatus as claimed in claim 7, further comprising control means for regulating the pressure of said medium in said storage means.

9. Apparatus as claimed in claim 6, further comprising a frame supporting a plurality of said converting means, and wherein said chamber comprises a structural part of said frame.

10. Apparatus as claimed in claim 1, further comprising energy storage means and wherein said energy conversion means on being reversed in response to diminished tension in said cord receives energy medium from said storage means.

11. Apparatus as claimed in claim 10, wherein said energy conversion means is a pump-motor device.

12. Apparatus as claimed in claim 10, further comprising means for supplying said energy medium to the other of said inlet/outlet means during unwinding rotation of said spool.

13. Apparatus as claimed in claim 12, wherein said means for supplying comprises a fluid retaining chamber, said medium being fluid.

14. Apparatus as claimed in claim 13, including means providing flow communication between said supply means and said storage means to form a closed loop including said device, in which loop said fluid is contained.

15. Apparatus as claimed in claim 14, further including throttling means regulating the flow of said medium between said storage means and said supply means.

16. Apparatus as claimed in claim 1, further including flow control means for regulating the flow of said medium between at least one of said inlet/outlet means and a respectively associated chamber.

17. Apparatus as claimed in claim 16, further including a frame, said storage means and said supply means respectively forming structural parts of said frame, said pump-motor device being mounted on said frame, and further comprising shut-off means associated with each said spool to prevent rotation thereof.

* * * * *